(12) United States Patent
Qiu

(10) Patent No.: US 10,554,413 B2
(45) Date of Patent: Feb. 4, 2020

(54) CROSS-BLOCKCHAIN AUTHENTICATION METHOD AND APPARATUS, AND ELECTRONIC DEVICE

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/374,346

(22) Filed: Apr. 3, 2019

(65) Prior Publication Data

US 2019/0305958 A1    Oct. 3, 2019

(30) Foreign Application Priority Data

Apr. 3, 2018   (CN) .......................... 2018 1 0291256

(51) Int. Cl.
*H04L 9/32* (2006.01)
(52) U.S. Cl.
CPC ........ *H04L 9/3236* (2013.01); *H04L 2209/38* (2013.01)
(58) Field of Classification Search
CPC .................................................. H04L 9/3236
See application file for complete search history.

(56) References Cited

U.S. PATENT DOCUMENTS

| 10,212,145 B2 | 2/2019 | Chavez et al. |
| 2016/0330034 A1 | 11/2016 | Back et al. |
| 2017/0366348 A1 | 12/2017 | Weimer et al. |

(Continued)

FOREIGN PATENT DOCUMENTS

| CN | 107231299 | 10/2017 |
| CN | 107248076 | 10/2017 |

(Continued)

OTHER PUBLICATIONS

Buterin (Chain Interoperability, Sep. 9, 2016, 25 pages) (Year: 2016).*
Crosby et al., "BlockChain Technology: Beyond Bitcoin," Sutardja Center for Entrepreneurship & Technology Technica Report, Oct. 16, 2015, 35 pages.

(Continued)

*Primary Examiner* — Oleg Korsak
(74) *Attorney, Agent, or Firm* — Fish & Richardson P.C.

(57) ABSTRACT

One or more implementations of the present specification provide cross-blockchain authentication. A subscribing client corresponding to a first blockchain and using a cross-chain client of a cross-blockchain interaction system, retrieves data from a second blockchain, where the data is published by a publishing client for use as an authentication data source, where the cross-blockchain interaction system comprises the subscribing client, the publishing client, and the cross-chain client, where the publishing client corresponds to the second blockchain, where the cross-chain client is separately interconnected with the subscribing client, and where the publishing client and the first blockchain are used as a sidechain that is anchored to the second blockchain, which is used as a main chain. Data to be authenticated is received from the second blockchain. The data to be authenticated is authenticated based on the authentication data source and a data authentication rule configured on the first blockchain.

20 Claims, 8 Drawing Sheets

(56) References Cited

U.S. PATENT DOCUMENTS

| | | | |
|---|---|---|---|
| 2018/0048461 A1 | 2/2018 | Jutla et al. | |
| 2018/0234241 A1 | 8/2018 | Weimer et al. | |
| 2019/0036680 A1 | 1/2019 | Sundaresan | |
| 2019/0036681 A1 | 1/2019 | Sundaresan | |
| 2019/0036932 A1 | 1/2019 | Bathen et al. | |

FOREIGN PATENT DOCUMENTS

| | | | |
|---|---|---|---|
| CN | 107301600 | | 10/2017 |
| CN | 107742210 A | * | 2/2018 |
| TW | 201741956 | | 12/2017 |

OTHER PUBLICATIONS

Nakamoto, "Bitcoin: A Peer-to-Peer Electronic Cash System," www.bitcoin.org, 2005, 9 pages.

Bonhill Group Plc, Information Age [Online], "Why cross-chain technology is the next big thing in the crypto community," Feb. 2018, [retrieved on May 14, 2019], retrieved from: URL<https://www.information-age.com/cross-chain-technology-crypto-community-12347091>, 3 pages.

International Search Report and Written Opinion in International Application No. PCT/US2019/024892, dated May 27, 2019, 15 pages.

POA Network [Online], "Cross-Chain Bridges: Paving the Way to the Internet of Blockchains," Nov. 2017, [retrieved on May 14, 2019], retrieved from: URL<https://medium.com/poa-network/cross-chain-bridges-paving-the-way-to-internet-of-blockchains-422ac94bc2e5>, 11 pages.

* cited by examiner

CROSS-BLOCKCHAIN AUTHENTICATION METHOD AND APPARATUS, AND ELECTRONIC DEVICE

CROSS-REFERENCE TO RELATED APPLICATIONS

This application claims priority to Chinese Patent Application No. 201810291256.0, filed on Apr. 3, 2018, which is hereby incorporated by reference in its entirety.

TECHNICAL FIELD

One or more implementations of the present specification relate to the field of blockchain technologies, and in particular, to a cross-blockchain authentication method and apparatus, and an electronic device.

BACKGROUND

Blockchain technology, also referred to as a distributed ledger technology, is an emerging technology in which several computing devices jointly participate in "accounting" to maintain a complete distributed database. The blockchain technology features decentralization and transparency, each computing device can record data in the database, and the data can be synchronized rapidly between the computing devices. Therefore, using the blockchain technology to establish a decentralized system and record various execution programs in a distributed database of a blockchain for automatic execution has been widely applied to many fields.

SUMMARY

The present specification provides a cross-blockchain authentication method, where the method is applied to a cross-blockchain interaction system including a subscribing client, a publishing client, and a cross-chain client, the subscribing client corresponds to a first blockchain, the publishing client corresponds to a second blockchain, the cross-chain client is separately interconnected with the subscribing client and the publishing client, and the method includes: obtaining, by the subscribing client by using the cross-chain client, data on the second blockchain that is published by the publishing client, to use the data as an authentication data source; receiving data to be authenticated from the second blockchain; and performing data authentication on the data to be authenticated based on the authentication data source and a data authentication rule configured on the first blockchain.

Optionally, the obtaining, by the subscribing client by using the cross-chain client, data on the second blockchain that is published by the publishing client, to use the data as an authentication data source includes: initiating, by the subscribing client, a subscription request to a cross-chain interaction end, where the subscription request is used to notify the cross-chain interaction end of a subscription condition, so that the cross-chain interaction end requests, based on the subscription condition, data on the second blockchain that satisfies the subscription condition from the publishing client; and obtaining, by the subscribing client, the data on the second blockchain that is published by the publishing client and that satisfies the subscription condition, to use the data as the authentication data source.

Optionally, the authentication data source includes block header data of each block on the second blockchain.

Optionally, the performing data authentication on the data to be authenticated based on the authentication data source and a data authentication rule configured on the first blockchain includes: performing SPV data authentication on the data to be authenticated based on the authentication data source and the data authentication rule configured on the first blockchain, to determine whether the data to be authenticated is included in the block on the second blockchain.

Optionally, the performing SPV data authentication on the data to be authenticated based on the authentication data source and the data authentication rule configured on the first blockchain includes: calculating a hash value of the data to be authenticated; obtaining a Merkle authentication path of the data to be authenticated on a Merkle tree of a target block on the second blockchain that includes the data to be authenticated; calculating a hash value of a block header of the target block based on the hash value of the data to be authenticated and a hash value of each node on the Merkle authentication path; and determining whether the calculated hash value of the block header of the target block matches a hash value that is of the block header of the target block and that is stored in the authentication data source; and if yes, determining that the data to be authenticated is included in the block on the second blockchain.

Optionally, the subscribing client corresponds to a node device on the first blockchain, and the publishing client corresponds to a node device on the second blockchain.

The present specification further provides a cross-blockchain authentication apparatus, where the apparatus is applied to a cross-blockchain interaction system including a subscribing client, a publishing client, and a cross-chain client, the subscribing client corresponds to a first blockchain, the publishing client corresponds to a second blockchain, the cross-chain client is separately interconnected with the subscribing client and the publishing client, and the apparatus includes: an acquisition module, configured to obtain, by using the cross-chain client, data on the second blockchain that is published by the publishing client, to use the data as an authentication data source; a receiving module, configured to receive data to be authenticated from the second blockchain; and an authentication module, configured to perform data authentication on the data to be authenticated based on the authentication data source and a data authentication rule configured on the first blockchain.

Optionally, the acquisition module is configured to: initiate a subscription request to a cross-chain interaction end, where the subscription request is used to notify the cross-chain interaction end of a subscription condition, so that the cross-chain interaction end requests, based on the subscription condition, data on the second blockchain that satisfies the subscription condition from the publishing client; and obtain the data on the second blockchain that is published by the publishing client and that satisfies the subscription condition, to use the data as the authentication data source.

Optionally, the authentication data source includes block header data of each block on the second blockchain.

Optionally, the authentication module is configured to: perform SPV data authentication on the data to be authenticated based on the authentication data source and the data authentication rule configured on the first blockchain, to determine whether the data to be authenticated is included in the block on the second blockchain.

Optionally, the authentication module is further configured to: calculate a hash value of the data to be authenticated; obtain a Merkle authentication path of the data to be authenticated on a Merkle tree of a target block on the second blockchain that includes the data to be authenticated;

calculate a hash value of a block header of the target block based on the hash value of the data to be authenticated and a hash value of each node on the Merkle authentication path; and determine whether the calculated hash value of the block header of the target block matches a hash value that is of the block header of the target block and that is stored in the authentication data source; and if yes, determine that the data to be authenticated is included in the block on the second blockchain.

Optionally, the subscribing client corresponds to a node device on the first blockchain, and the publishing client corresponds to a node device on the second blockchain.

The present specification further provides an electronic device, including: a processor; a memory, configured to store a machine executable instruction. By reading and executing the machine executable instruction that is stored in the memory and that corresponds to blockchain-based cross-blockchain authentication control logic, the processor is configured to: obtain, by using a cross-chain client, data on a second blockchain that is published by a publishing client, to use the data as an authentication data source; receive data to be authenticated from the second blockchain; and perform data authentication on the data to be authenticated based on the authentication data source and a data authentication rule configured on a first blockchain.

According to the previous implementations, the subscribing client obtains, by using the cross-chain client that is separately interconnected with the first blockchain and the second blockchain, the data on the second blockchain that is published by the publishing client, to use the data as the authentication data source. Further, when receiving the data to be authenticated from the second blockchain, the subscribing client can perform data authentication on the data to be authenticated based on the authentication data source and the data authentication rule configured on the first blockchain. The cross-chain client can be used to synchronize data between the first blockchain and the second blockchain through subscription and publishing, and the synchronized data is used as the authentication data source to authenticate data from a peer blockchain. Therefore, when mutually isolated, different blockchains can verify data on a peer blockchain, and implement non-invasive sidechain anchoring, to be further effectively anchored to another blockchain, and to establish a low-complexity and high-expansibility cross-chain network.

DESCRIPTION OF IMPLEMENTATIONS

A sidechain technology is a technology in which one blockchain is used as a mainchain and then a sidechain is developed based on the mainchain, and sidechain anchoring is implemented between the sidechain and the mainchain.

The sidechain is a blockchain that can authenticate data from the mainchain. For example, whether a transaction, a block, or blockchain data in another form is included in a block on the mainchain can be verified on the sidechain. A blockchain that can authenticate data on another blockchain is referred to as a sidechain of the other blockchain. Correspondingly, the sidechain anchoring is a process of setting an authentication root (usually including an authentication data source and an authentication rule) on a sidechain to enable the sidechain to have the capability of authenticating data from a mainchain.

The present specification aims to provide a sidechain anchoring framework based on a subscription and publishing model, so that different blockchains can implement non-invasive sidechain anchoring when mutually isolated.

During implementation, a cross-blockchain interaction system including a subscribing client, a publishing client, and a cross-chain client can be established. The subscribing client corresponds to a first blockchain; the publishing client corresponds to a second blockchain, and the cross-chain client can be separately interconnected with the subscribing client and the publishing client.

The subscribing client can subscribe to the cross-chain client for data of the second block chain, and obtain, by using the cross-chain client, data on the second blockchain that is published by the publishing client, to use the data as authentication data source. Further, when receiving data to be authenticated from the second blockchain, the subscribing client can perform data authentication on the data to be authenticated based on the authentication data source and a data authentication rule configured on the first blockchain.

In the previous technical solution, the cross-chain client can be used to synchronize data between the first blockchain and the second blockchain through subscription and publishing, and the synchronized data is used as the authentication data source to authenticate data from a peer blockchain. Therefore, when mutually isolated, different blockchains can verify data on a peer blockchain, and implement non-invasive sidechain anchoring, to be further effectively anchored to another blockchain, and to establish a low-complexity and high-expansibility cross-chain network.

The present specification is described below by using specific implementations with reference to specific application scenarios.

Figure 1:
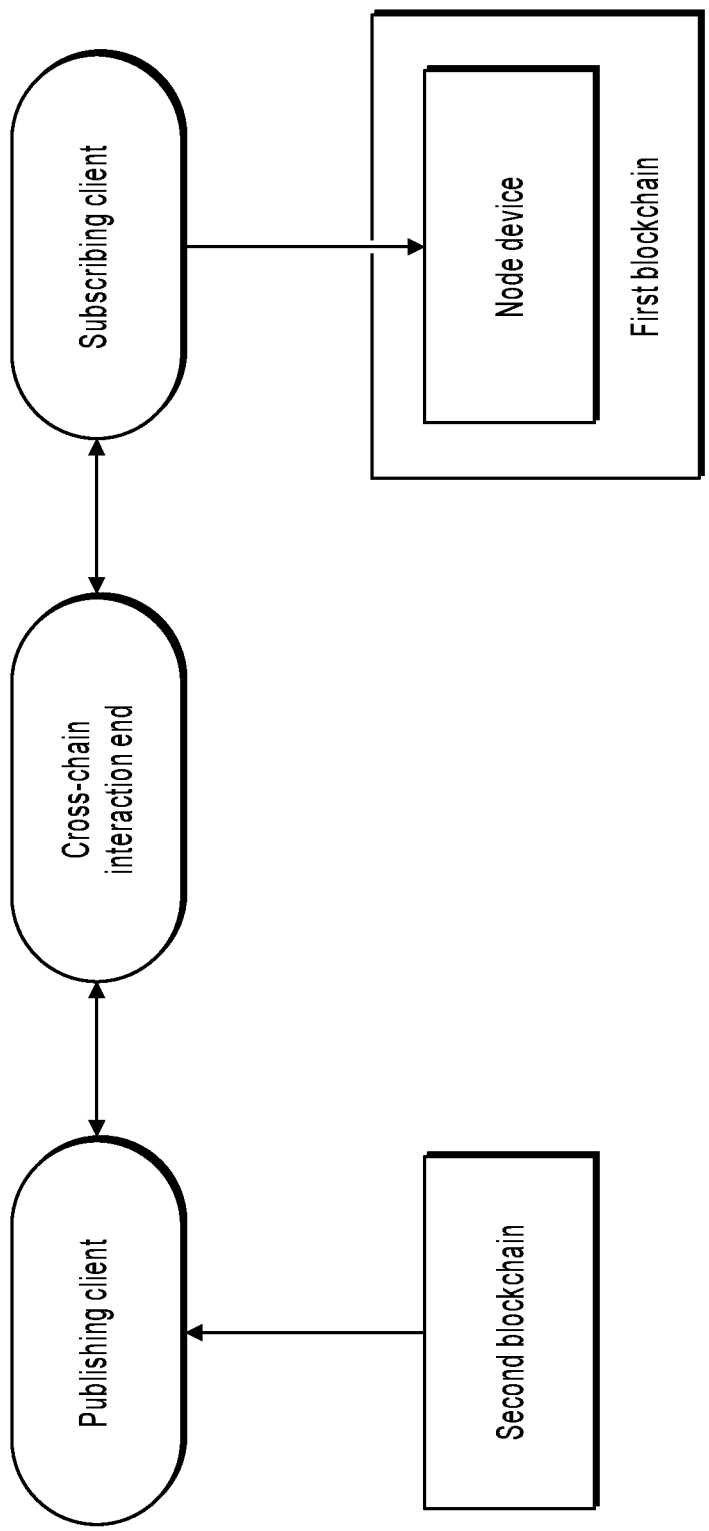
FIG. 1 is a schematic architectural diagram illustrating a cross-blockchain interaction system, according to an example implementation.

Referring to FIG. 1, FIG. 1 is a schematic architectural diagram illustrating a cross-blockchain interaction system, according to an example implementation.

As shown in FIG. 1, the cross-blockchain interaction system can be a sidechain anchoring framework established based on a publishing and subscription model, and can include the following: a first blockchain and a second blockchain.

A first blockchain is an anchoring chain (which can be used as a sidechain) corresponding to a subscribing client in the present specification, and correspondingly, a second blockchain is an anchored chain (which can be used as a mainchain) corresponding to a publishing client in the present specification.

It is worthwhile to note that in the present specification, the "first blockchain" and the "second blockchain" are only used to distinguish between different blockchains. The first blockchain is generally a type of blockchain that can be used as a sidechain, and the second blockchain is generally a type of blockchain that can be used as a mainchain. It is not specified whether a blockchain is a "first blockchain" or a "second blockchain".

The subscribing client corresponds to the first blockchain, and is configured to maintain data that the first blockchain subscribes to from the second blockchain.

As shown in FIG. 1, in an implementation, the subscribing client can correspond to a node device on the first blockchain, and is configured to maintain a message queue corresponding to the node device. The message queue includes data that the node device subscribes to.

For example, the subscribing client can be a client software component implemented by using a smart contract on the first blockchain, or a client software component implemented based on a native expansion capability of the node device interconnected with the subscribing client.

In another implementation, the subscribing client can be configured on a device, a node, a platform, etc. independent of the first blockchain, and is bridged to the first blockchain by using an implemented bridge interface.

A publishing client corresponds to the second blockchain, and is configured to obtain and publish data on the second blockchain that is completed through consensus.

For example, during implementation, the publishing client can implement a bridge interface to provide a second blockchain-oriented data query service, and is bridged to the second blockchain. Based on a distributed ledger feature of a blockchain, all node devices on the second blockchain can maintain full ledger data, namely, a blockchain ledger with the same content through consensus. The publishing client can obtain, from the blockchain ledger, a message that is allowed to be published, so that a cross-chain interaction end obtains the message.

In an implementation, the publishing client can correspond to a node device on the second blockchain. In another implementation, the publishing client can be configured on a device, a node, a platform, etc. independent of the second blockchain. In another implementation, the publishing client can be configured on a node device on the second blockchain.

The cross-chain interaction end is separately interconnected with the first blockchain and the second blockchain by using bridge interfaces, and implement cross-chain data synchronization between the first blockchain and the second blockchain based on implemented data transfer logic. In an implementation, the cross-chain interaction end can receive a subscription request initiated by the subscribing client. The subscription request includes a subscription condition, and the subscription condition is used to notify the cross-chain interaction end of a related subscription requirement. The cross-chain interaction end can initiate a status query message to the subscribing client to query a data status maintained by the subscribing client, and determine, based on a data status returned by the subscribing client, whether data maintained by the subscribing client includes data that satisfies the subscription condition.

For example, during implementation, the subscribing client can correspond to a node device on the first blockchain, and maintain a message queue corresponding to the node device, to maintain the data that the node device subscribes to. In such a case, the cross-chain interaction end can initiate a status query message to the subscribing client to query a queue status of the message queue, and determine, based on a queue status that is of the message queue and that is returned by the subscribing client, whether the message queue includes a message that satisfies the subscription condition.

If the data maintained by the subscribing client includes the data that satisfies the subscription condition, the cross-chain interaction end does not need to obtain the data again. If the data maintained by the subscribing client does not include the data that satisfies the subscription condition, the cross-chain interaction end needs to obtain the data that satisfies the subscription condition from the publishing client. For example, the cross-chain end can request the data that satisfies the subscription condition from the publishing client, and sends, to the subscribing client, data returned by the publishing client, to update the data maintained by the subscribing client.

In the present specification, the cross-chain interaction end is only used to transfer data between the publishing client and the subscribing client, and does not need to persistently store the transferred data or maintain a data status of the transferred data. In an implementation, the cross-chain interaction end can be configured on a device, a node, a platform etc. independent of the first blockchain and the second blockchain. In another implementation, the cross-chain interaction end can be configured on the node device on the first blockchain or on the node device on the second blockchain.

Figure 2:
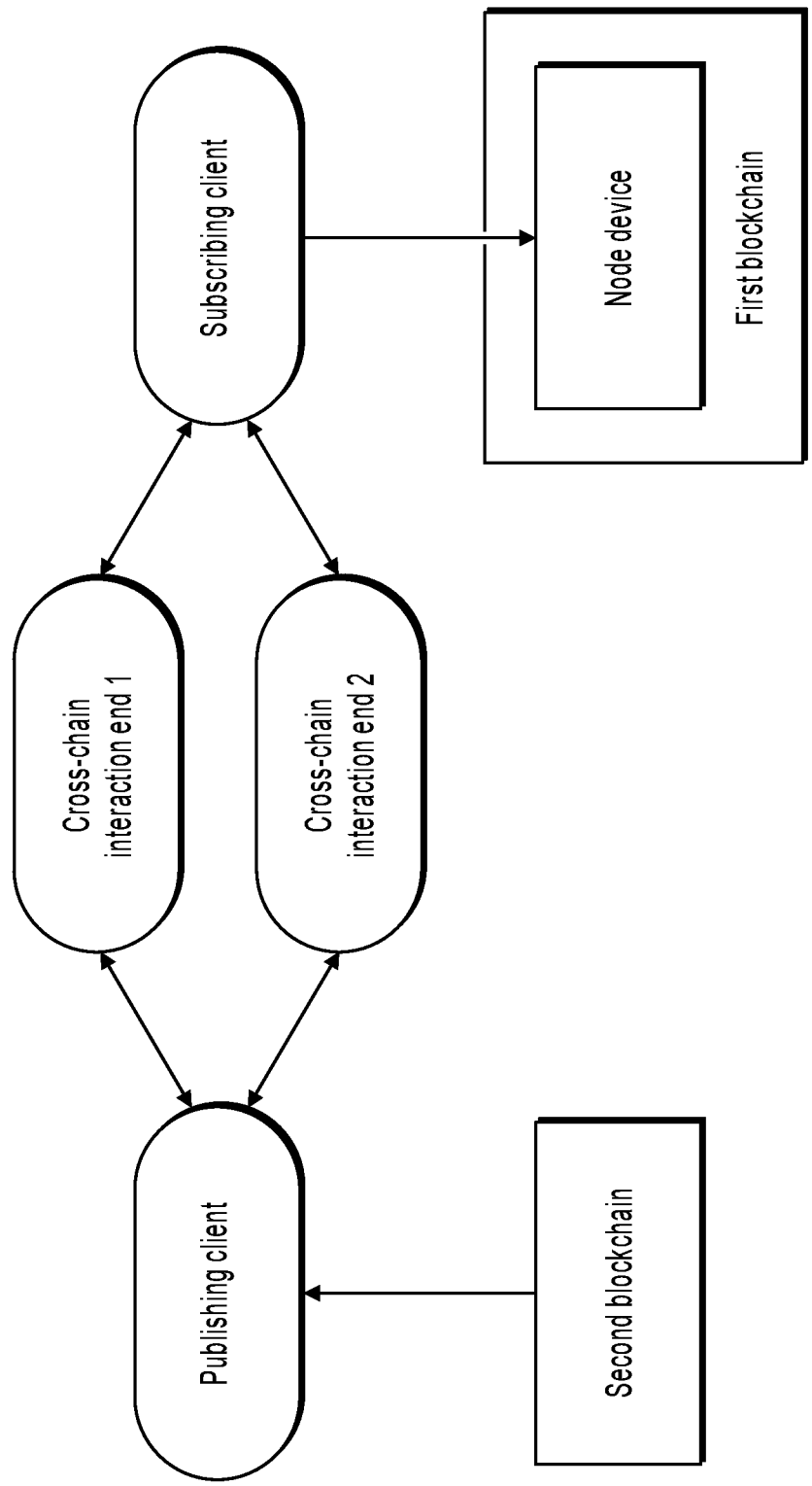
FIG. 2 is a schematic architectural diagram illustrating another cross-blockchain interaction system, according to an example implementation.

References can still be made to FIG. 2. In actual applications, a plurality of mutually independent cross-chain interaction ends can be configured between the subscribing client and the publishing client. In other words, the subscribing client and the publishing client can be separately interconnected with a plurality of independent cross-chain interaction ends, for example, cross-chain interaction end 1 and cross-chain interaction end 2 shown in FIG. 2.

As such, when a cross-chain interaction end suffers from denial of service attack, etc., a service carried by the cross-chain interaction end that suffers from the denial of service attack can be quickly handed over to another cross-chain interaction end. For example, as shown in FIG. 2, when cross-chain interaction end 1 suffers from the refusal service attack, a service carried by cross-chain interaction end 1 can be immediately handed over to cross-chain interaction end 2, so that the subscribing client can still obtain, by using cross-chain interaction end 2, a message published by the publishing client.

In the previous implementation, in the cross-blockchain interaction system established based on the publishing and subscription model, the cross-chain interaction end that is separately bridged to the publishing client and the subscribing client is used to synchronize data between the first blockchain and the second blockchain by using a publishing and subscription information exchanging mode. Therefore, data between the first blockchain and the second blockchain can be isolated, and the first blockchain and the second blockchain do not need to directly exchange data to complete data synchronization. In addition, because the cross-chain interaction end is used between the publishing client and the subscribing client, the publishing client and the subscribing client are decoupled in terms of service, and thus the difficulty in developing the publishing client and the subscribing client is significantly reduced. For example, service logic related to the publishing client does not need to be implemented based on the first blockchain, service logic related to the subscribing client does not need to be implemented based on the second blockchain, and the service logic related to the publishing client and the service logic related to the subscribing client only need to be respectively implemented on the first blockchain and the second blockchain.

Figure 3:
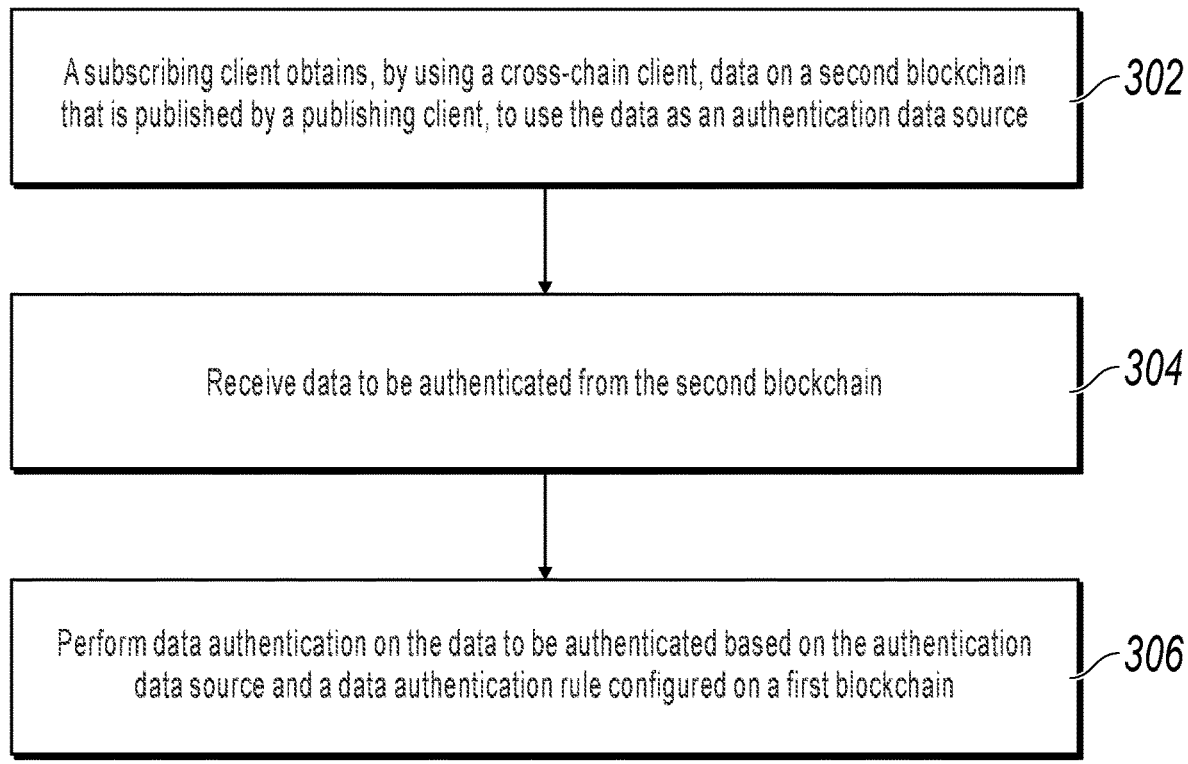
FIG. 3 is a flowchart illustrating a cross-blockchain authentication method, according to an example implementation.

Referring to FIG. 3, FIG. 3 shows a cross-blockchain authentication method, according to an implementation of the present specification. The method is applied to the subscribing client in the cross-blockchain interaction system shown in FIG. 1, and includes the following steps:

Step 302: The subscribing client obtains, by using a cross-chain client, data on a second blockchain that is published by a publishing client, to use the data as an authentication data source.

Step 304: Receive data to be authenticated from the second blockchain.

Step 306: Perform data authentication on the data to be authenticated based on the authentication data source and a data authentication rule configured on a first blockchain.

A blockchain described in the present implementation can include any type of a blockchain network that can be used as a sidechain and that is anchored to another blockchain network.

For example, in a scenario, the blockchain can be any member blockchain in a consortium blockchain including several member blockchains. In the consortium blockchain, each member blockchain can be used as a sidechain to be anchored to another member blockchain.

The data to be authenticated can include any form of data recorded in blocks on the first blockchain. For example, the data to be authenticated can include but is not limited to a transaction (transfer), a status, and an event.

In the present specification, an authentication root corresponding to the second blockchain can be set in the subscribing client, so that the subscribing client can authenticate data on the second blockchain, and the first blockchain is used as a sidechain and anchored to the second blockchain.

The authentication root specified in the subscribing client usually includes two parts: the authentication data source and the authentication rule.

The authentication data source can include all or some data of all blocks stored on the first blockchain.

It is worthwhile to note that specific content included in the authentication data source usually depends on a data authentication protocol supported by the first blockchain and the second blockchain.

For example, the first blockchain and the second blockchain support the simplified payment verification (SPV) authentication protocol. In such a scenario, the authentication data source specified in the subscribing client can include only block header data of all blocks stored on the second blockchain.

For another example, the first blockchain and the second blockchain support the Oracle (Oracle) protocol. In such a scenario, the authentication data source specified in the subscribing client can include a public key or a public key set corresponding to a private key used when a trusted node (also referred to as an authority node) selected on the second blockchain signs data on the second blockchain.

The authentication rule includes authentication logic for authenticating the data on the second blockchain. It is worthwhile to note that a type of the authentication logic included in the authentication rule usually depends on a specific type of the data recorded on the second blockchain.

For example, in actual applications, the data on the second blockchain can include but is not limited to a transaction, a status, and an event. Correspondingly, the authentication rule can include but is not limited to transaction authentication logic, block authentication logic, status authentication logic, and event authentication logic. In addition, specific content of the authentication logic included in the authentication rule usually depends on the data authentication protocol supported by the first blockchain and the second blockchain.

For example, the first blockchain and the second blockchain support the SPV protocol. In such a scenario, the authentication logic included in the authentication rule specified in the subscribing client can be authentication logic for authenticating whether the data to be authenticated that is received by the subscribing client from the second blockchain is included in a block on the second blockchain. The authentication on the data to be authenticated succeeds if the data to be authenticated is included in the block on the second blockchain.

For another example, the first blockchain and the second blockchain support the Oracle protocol. In such a scenario, the authentication logic included in the authentication rule specified in the subscribing client can be authentication logic for verifying, based on the specified public key or the public key set corresponding to the private key used when the trusted node selected on the second blockchain signs the data on the second blockchain, a signature carried in the data to be authenticated that is received by the subscribing client from the second blockchain. The authentication on the data to be authenticated succeeds if the signature carried in the data to be authenticated is a valid signature of the trusted node.

A process in which the subscribing client authenticates the data on the second blockchain is described below in detail by using an example that both the first blockchain and the second blockchain support the SPV protocol and the data to be authenticated is a transaction recorded in the block on the second blockchain.

In the present implementation, when the first blockchain is used as a sidechain and is anchored to the second blockchain that is used as a mainchain, the authentication root corresponding to the second blockchain can be configured in the subscribing client.

An authentication rule used to authenticate the transaction on the second blockchain can be configured in the subscribing client. For the SPV protocol, the authentication rule can include authentication logic for authenticating whether a transaction to be authenticated is included in the block on the second blockchain.

In addition, the subscribing client can perform cross-chain interaction with the publishing client by using the cross-chain interaction end, and obtain block header data that is of each block on the second blockchain and that is published by the publishing client, to use the block header data as the authentication data source.

During implementation, the subscribing client can initiate a subscription request to the cross-chain interaction end, and the subscription request can include a subscription condition that indicates a subscription requirement. For the SPV protocol, the authentication data source can be the block header data of each block on the second blockchain, namely, a "simple blockchain" including block headers of blocks on the second blockchain. Correspondingly, the subscription requirement indicated by the subscription condition carried in the subscription request can be a requirement of obtaining the block header data of each block on the second blockchain.

After obtaining the subscription request, the cross-chain interaction end can parse the subscription request, and obtain the subscription requirement indicated by the subscription condition carried in the subscription request.

After obtaining the subscription requirement from the subscribing client, the cross-chain interaction end can initiate a status query message to the subscribing client to query a data status maintained by the subscribing client, and determine, based on a data status returned by the subscribing client, whether data maintained by the subscribing client includes the simple blockchain including the block headers of the blocks on the second blockchain.

For example, when the subscribing client maintains subscribed data by using a message queue, the cross-chain interaction end can initiate a status query message to the subscribing client to query a queue status of the message queue, and determine, based on a queue status that is of the message queue and that is returned by the subscribing client, whether the data maintained by the subscribing client includes the simple blockchain including the block headers of the blocks on the second blockchain.

If the data maintained by the subscribing client includes the simple blockchain including the block headers of the blocks on the second blockchain, the cross-chain interaction end does not need to obtain the block header data of each block on the second blockchain again.

If the data maintained by the subscribing client does not include the simple blockchain including the block headers of the blocks on the second blockchain, the cross-chain interaction end needs to obtain the block header data of each block on the second blockchain from the publishing client. For example, the cross-chain interaction end can send a data synchronization request to the publishing client to request the block header data of each block on the second blockchain from the publishing client, and send data returned by the publishing client to the subscribing client, to update the data maintained by the subscribing client.

Certainly, in actual applications, if the cross-chain interaction end determines, by using the status query process shown above, that a new block is added to the second blockchain, the cross-chain interaction end can send a block header data of the newly added block on the second blockchain to the subscribing client by using the previously illustrated data synchronization method, to update, in a timely way, the data maintained by the subscribing client.

In the present implementation, after receiving the block header data of each block on the second blockchain, the subscribing client can further authenticate the received block header data, to determine whether the received block header data is valid. An authentication rule used to authenticate the received block header data can also be preconfigured in the subscribing client, and authentication logic corresponding to the authentication rule for authenticating the validity of the block header data is not limited in the present specification.

For example, in an implementation, the first blockchain and the second blockchain use a Proof of Work consensus mechanism, and a random number (Nonce) corresponding to Proof of Work "mining" difficulty is usually recorded in the block header. In such a case, the subscribing client can perform Proof of Work calculation based on the random number, and then verify the validity of the block header data based on a calculation result.

For another example, in another implementation, several trusted nodes are selected on the second blockchain, the trusted nodes can sign the block header data published by the publishing client, and the subscribing client can authenticate a signature by using public keys of the trusted nodes, to determine whether the received block header data is valid.

After authenticating the validity of the received block header data, the subscribing client can locally store and configure the received data as the authentication data source. After receiving a transaction to be authenticated from the second blockchain subsequently, the subscribing client can perform SPV data authentication on the transaction to be authenticated based on the configured authentication rule and the authentication data source, to determine whether the transaction to be authenticated is included in the block on the second blockchain.

In actual applications, the transaction to be authenticated that is received by the subscribing client from the second blockchain can be a transaction that is actively published by the publishing client and that is received by the subscribing client by performing cross-chain interaction with the publishing client by using the cross-chain interaction end, or a transaction that is manually submitted by a user who initiates a transaction authentication. Implementations are not limited in the present specification.

Figure 4:
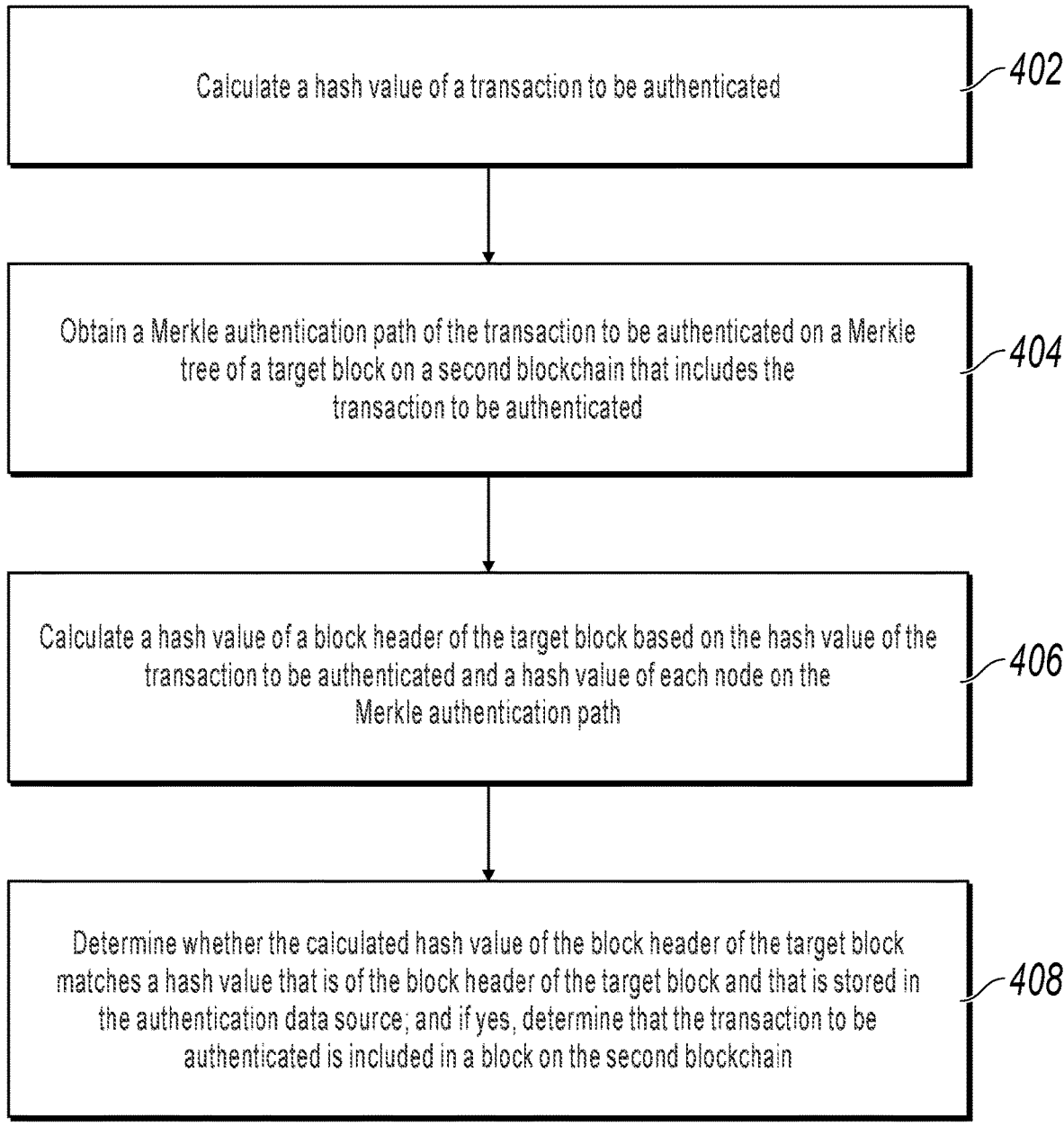
FIG. 4 is a flowchart illustrating SPV authentication performed on a transaction to be authenticated, according to an example implementation.

Referring to FIG. 4, FIG. 4 is a flowchart illustrating SPV authentication performed on a transaction to be authenticated, according to an implementation of the present specification. The following execution steps are included.

Step 402: Calculate a hash value of a transaction to be authenticated.

It is worthwhile to note that performing SPV authentication on the transaction to be authenticated is a process of verifying whether the hash value of the transaction to be authenticated is the same as a hash value that is of a target block including the transaction to be authenticated on a second blockchain and that is obtained by performing reverse calculation based on a hash value of each node on a Merkle authentication path on a Merkle tree of the target block.

Therefore, the hash value of the transaction to be authenticated needs to be calculated first before performing SPV authentication on the transaction to be authenticated. A specific process of calculating the hash value of the transaction to be authenticated is omitted in the present implementation.

Step 404: Obtain a Merkle authentication path of the transaction to be authenticated on a Merkle tree of a target block on a second blockchain that includes the transaction to be authenticated.

A block on a blockchain usually includes two parts: a block header and a block body (including a transaction). Transactions recorded in the block usually form a Merkle tree in a form of hash values of the transactions. On the Merkle tree, a hash value of each transaction recorded in the block is used as a leaf node. Hash values of two adjacent transactions are concatenated, and then a result is hashed to obtain a hash value of a relay node at a previous level; then, hash values of two adjacent nodes among all relay nodes are concatenated, and a result is also hashed to obtain a hash value of a relay node at a further previous level; and so on. A hash value of a root node of the Merkle tree is finally obtained after level-by-level calculation is performed a plurality of times. The hash value can be used as a hash value of the block header. In addition to the root node and the leaf node, the Merkle tree further includes several relay nodes corresponding to hash values calculated in an intermediate calculation process.

A specific process that the hash values of the transactions recorded in the block form the Merkle tree is not limited in the present specification. When implementing the technical solution of the present specification, a person of ordinary skill in the art can refer to the descriptions in related technologies.

A root node on a Merkle tree in each block on the blockchain, namely, a hash value of the block header is usually recorded in the block header. The relay node and the leaf node other than the root node on the Merkle tree are recorded in the block body.

The Merkle authentication path is a path including a brother node (namely, an adjacent node) corresponding to a node on a path that a hash value of a transaction traverses level by level on the Merkle tree. In a process of performing SPV authentication on a transaction, a Merkle authentication path of the transaction can be used as a calculation parameter for reversely calculating a hash value corresponding to a root node on a Merkle tree of the transaction.

It is worthwhile to note that the Merkle authentication path can be manually submitted by a user who initiates a transaction authentication, or can be obtained by a subscribing client through active querying by performing cross-chain interaction with a publishing client by using a cross-chain interaction end.

In a method, when the user requests to authenticate a transaction from the second blockchain on a subscribing client on a first blockchain, the user can use a Merkle authentication path of the transaction on a Merkle tree of a target block that includes the transaction on the second blockchain as an authentication parameter, and submit the Merkle authentication path to the sub scribing client.

In another method, when the subscribing client performs cross-chain interaction with the publishing client by using the cross-chain interaction end, to actively query and obtain the Merkle authentication path corresponding to the transaction to be authenticated, the publishing client can first locate a block of the transaction on the second blockchain based on the hash value of the transaction to be authenticated.

A process of locating a block of a transaction based on a hash value of the transaction is omitted in the present specification. For example, in a related technology, a Bloom filter can be deployed to locate the block of the hash value of the transaction. After locating the block of the transaction to be authenticated, the Merkle authentication path of the hash value of the transaction to be authenticated can be further identified from a Merkle tree of the located block, and then the Merkle authentication path is sent to the subscribing client.

Step 406: Calculate a hash value of a block header of the target block based on the hash value of the transaction to be authenticated and a hash value of each node on the Merkle authentication path.

After obtaining the Merkle authentication path of the transaction to be authenticated, the subscribing client can calculate the hash value of the block header of the target block (namely, a hash value of a root node on the Merkle tree of the target block) based on a calculation process specified in the SPV protocol.

For example, based on the SPV protocol, the hash value of the transaction to be authenticated and a hash value of a brother node that is on the Merkle authentication path and that corresponds to a node of the transaction to be authenticated are concatenated, and a result is hashed to obtain a hash value of an relay node at a previous level; then, the hash value of the relay node and a hash value of a brother node that corresponds to the relay node on the Merkle authentication path are concatenated, and a result is hashed to obtain a hash value of a relay node at a further previous level; and so on, until the hash value of the root node is calculated, in other words, the hash value of the block header of the target block of the transaction to be authenticated on the second blockchain is obtained.

Step 408: Determine whether the calculated hash value of the block header of the target block matches a hash value that is of the block header of the target block and that is stored in an authentication data source; and if yes, determine that the transaction to be authenticated is included in a block on the second blockchain.

After calculating the hash value of the block header of the target block of the transaction to be authenticated on the second blockchain, the subscribing client can match the calculated hash value of the block header of the target block with the hash value that is of the block header of the target block and that is stored in the locally configured authentication data source. If the two hash values are consistent, the transaction to be authenticated is included in the block on the second blockchain, and the authentication on the transaction to be authenticated succeeds; or if the two hash values are inconsistent, the transaction to be authenticated is not included in the block on the second blockchain, and the authentication on the transaction to be authenticated fails.

After the authentication on the transaction to be authenticated succeeds, the subscribing client can trigger an operation related to the transaction to be authenticated on the first blockchain.

For ease of understanding, a cross-blockchain associated transfer scenario is used as an example for description.

Figure 5:
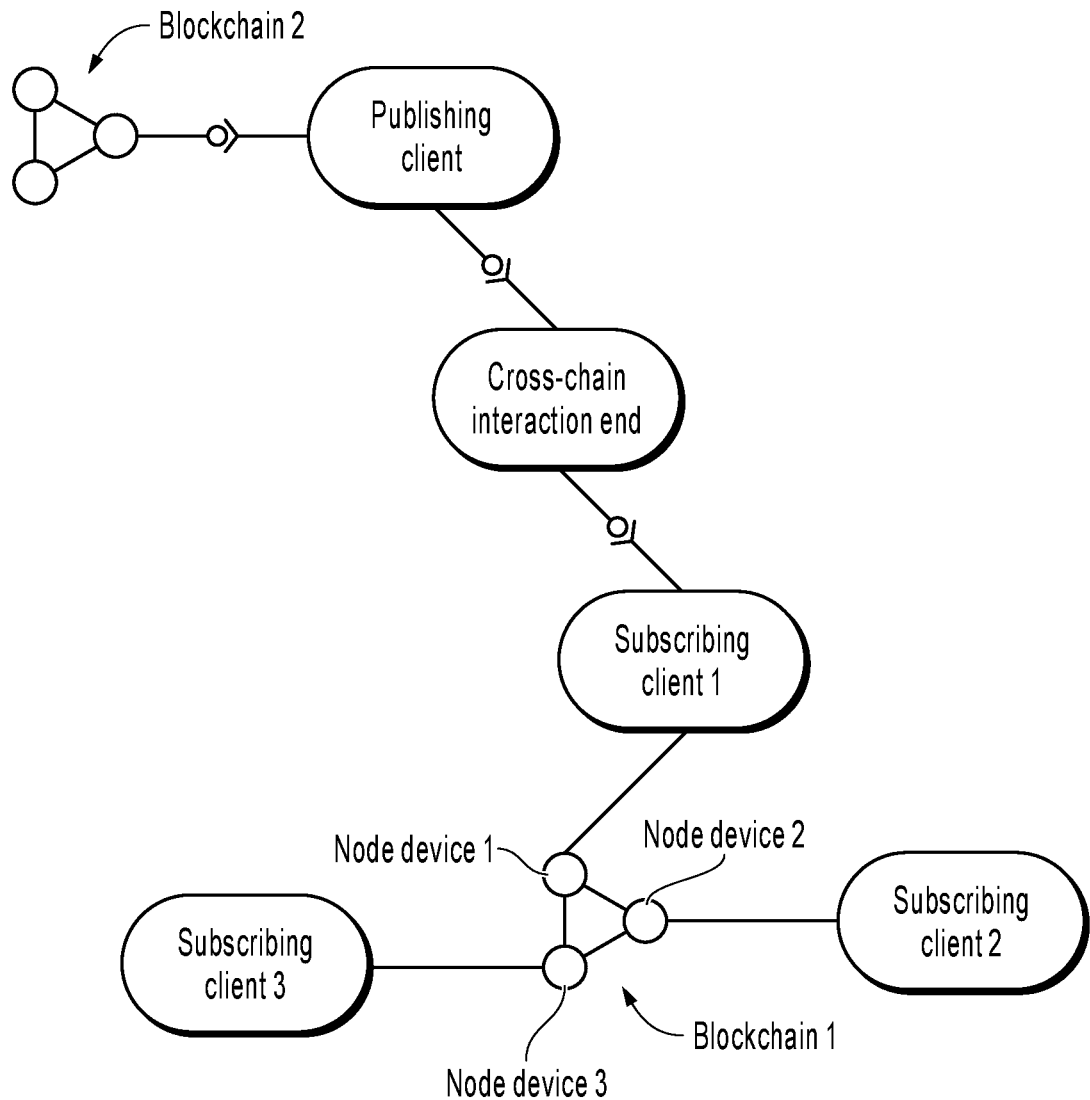
FIG. 5 is a schematic structural diagram illustrating a cross-blockchain associated transfer system, according to an example implementation.

Referring to FIG. 5, FIG. 5 is a schematic structural diagram illustrating a cross-blockchain associated transfer system, according to an example implementation. As shown in FIG. 5, assume that user A separately has account A1 on blockchain 1 and account A2 on blockchain 2, and user B separately has account B1 on blockchain 1 and account B2 on blockchain 2. Account A1 and account B1 on blockchain 1 are used to maintain a certain type of asset object (for example, RMB), and account A2 and account B2 on blockchain 2 are used to maintain another type of asset object (for example, Securities). When user A wants to sell the securities to user B, the following associated transfer logic can be used: A specified quantity of security assets are transferred from account A2 to account B2, and then a specified amount of RMB is transferred from account B1 to account A1.

To improve reliability in a transfer process, corresponding smart contracts can be separately set on blockchain 1 and blockchain 2, to automatically complete the two previous transfer processes, avoid an intentional or unintentional transfer amount error, delay, etc. in a manual transfer process of a user, and ensure that the transfer process is completed quickly and accurately.

Based on the technical solutions of the present specification, based on the previously described process, blockchain 1 can be used as a sidechain and is anchored to blockchain 2 that is used as a mainchain. In such a case, the user can submit, to the smart contract as an input for execution, a completed transaction that a specified quantity of security assets are transferred from account A2 to account B2 on blockchain 2. And, the subscribing client (for example, an SPV wallet) can authenticate, based on a configured authentication data source (namely, a simple blockchain including block header data) on blockchain 2, whether the transaction is included in a block on blockchain 2. If the authentication succeeds, the previous smart contract can be invoked to trigger a transaction that a specified amount of RMB is transferred from account B1 to account A1 on blockchain 1.

It can be learned from the previous implementations that the subscribing client obtains, by using the cross-chain client that is separately interconnected with the first blockchain and the second blockchain, the data on the second blockchain that is published by the publishing client, to use the data as the authentication data source. Further, when receiving the data to be authenticated from the second blockchain, the subscribing client can perform data authentication on the data to be authenticated based on the authentication data source and the data authentication rule configured on the first blockchain. The cross-chain client can be used to synchronize data between the first blockchain and the second blockchain through subscription and publishing, and the synchronized data is used as the authentication data source to authenticate data from a peer blockchain. Therefore, when mutually isolated, different blockchains can verify data on a peer blockchain, and implement non-invasive sidechain anchoring, to be further effectively anchored to another blockchain, and to establish a low-complexity and high-expansibility cross-chain network.

Figure 6:
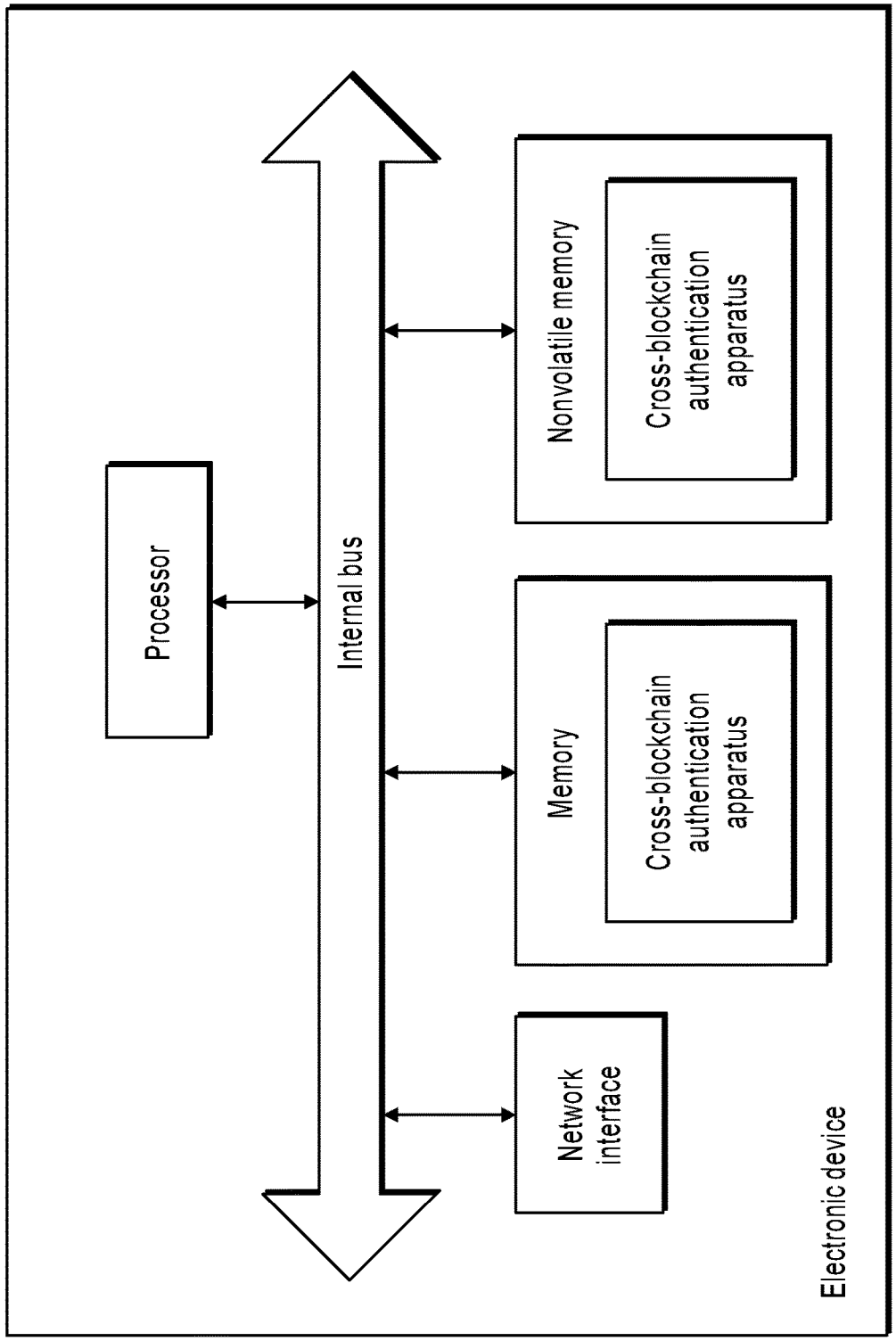
FIG. 6 is a schematic structural diagram illustrating an electronic device, according to an example implementation.

Corresponding to the previous method implementations, the present specification further provides an implementation of a cross-blockchain authentication apparatus. Implementations of the cross-blockchain authentication apparatus in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a nonvolatile memory to a memory for running by a processor of the electronic device where the apparatus is located. In terms of hardware, as shown in FIG. 6, FIG. 6 is a hardware structural diagram illustrating an electronic device where the cross-blockchain authentication apparatus is located in the present specification. In addition to a processor, a memory, a network interface, and a nonvolatile memory shown in FIG. 6, the electronic device where the apparatus is located in the present implementation can usually further include other hardware based on an actual function of the electronic device. Details are omitted for simplicity.

Figure 7:
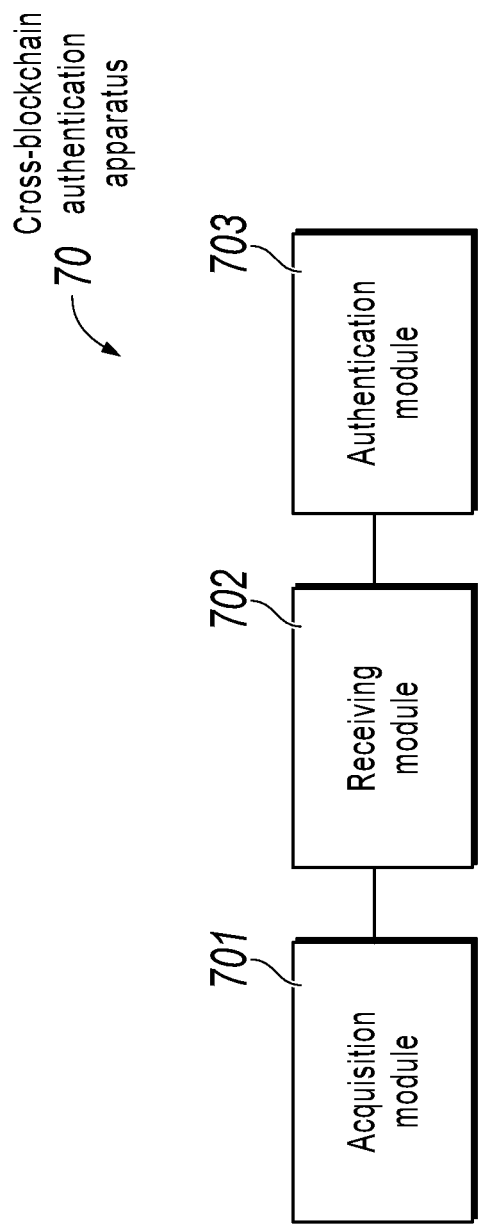
FIG. 7 is a block diagram illustrating a cross-blockchain authentication apparatus, according to an example implementation.

FIG. 7 is a block diagram illustrating a cross-blockchain authentication apparatus, according to an example implementation of the present specification.

Referring to FIG. 7, the cross-blockchain authentication apparatus 70 can be applied to the electronic device shown in FIG. 6, and the electronic device is located in a cross-blockchain interaction system including a subscribing client, a publishing client, and a cross-chain client. The subscribing client corresponds to a first blockchain, the publishing client corresponds to a second blockchain, and the cross-chain client is separately interconnected with the subscribing client and the publishing client. The apparatus 70 includes an acquisition module 701, a receiving module 702, and an authentication module 703.

The acquisition module 701 is configured to obtain, by using the cross-chain client, data on the second blockchain that is published by the publishing client, to use the data as an authentication data source.

The receiving module 702 is configured to receive data to be authenticated from the second blockchain.

The authentication module 703 is configured to perform data authentication on the data to be authenticated based on the authentication data source and a data authentication rule configured on the first blockchain.

In the present implementation, the acquisition module 701 is configured to: initiate a subscription request to a cross-chain interaction end, where the subscription request is used to notify the cross-chain interaction end of a subscription condition, so that the cross-chain interaction end requests, based on the subscription condition, data on the second blockchain that satisfies the subscription condition from the publishing client; and obtain the data on the second blockchain that is published by the publishing client and that satisfies the subscription condition, to use the data as the authentication data source.

In the present implementation, the authentication data source includes block header data of each block on the second blockchain.

In the present implementation, the authentication module 703 is configured to perform SPV data authentication on the data to be authenticated based on the authentication data source and the data authentication rule configured on the first blockchain, to determine whether the data to be authenticated is included in the block on the second blockchain.

In the present implementation, the authentication module 703 is further configured to: calculate a hash value of the data to be authenticated; obtain a Merkle authentication path of the data to be authenticated on a Merkle tree of a target block on the second blockchain that includes the data to be authenticated; calculate a hash value of a block header of the target block based on the hash value of the data to be authenticated and a hash value of each node on the Merkle authentication path; and determine whether the calculated hash value of the block header of the target block matches a hash value that is of the block header of the target block and that is stored in the authentication data source; and if yes, determine that the data to be authenticated is included in the block on the second blockchain.

In the present implementation, the subscribing client corresponds to a node device on the first blockchain, and the publishing client corresponds to a node device on the second blockchain.

For an implementation process of functions and roles of each module in the apparatus, references can be made to an implementation process of a corresponding step in the previous method. Details are omitted here for simplicity.

Because an apparatus implementation basically corresponds to a method implementation, for related parts, references can be made to related descriptions in the method implementation. The previously described apparatus implementation is merely an example. The modules described as separate parts may or may not be physically separate, and parts displayed as modules may or may not be physical modules, may be located in one location, or may be distributed on a plurality of network modules. Some or all of the modules can be selected based on actual needs to achieve the objectives of the solutions in the present specification. A person of ordinary skill in the art can understand and implement the implementations of the present specification without creative efforts.

The system, apparatus, or module illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method implementation, the present specification further provides an implementation of an electronic device. The electronic device is located in a cross-blockchain interaction system including a subscribing client, a publishing client, and a cross-chain client, the subscribing client corresponds to a first blockchain, the publishing client corresponds to a second blockchain, the cross-chain client is separately interconnected with the subscribing client and the publishing client, and the electronic device includes a processor, and a memory that is configured to store a machine executable instruction, and the processor and the memory are usually connected to each other by using an internal bus. In another possible implementation, the device can further include an external interface, to communicate with another device or component.

In the present implementation, by reading and executing a machine executable instruction that is stored in the memory and that corresponds to cross-blockchain authentication control logic, the processor is configured to obtain, by using a cross-chain client, data on the second blockchain that is published by a publishing client, to use the data as an authentication data source; receive data to be authenticated from the second blockchain; and perform data authentication on the data to be authenticated based on the authentication data source and a data authentication rule configured on the first blockchain.

In the present implementation, by reading and executing the machine executable instruction that is stored in the memory and that corresponds to the cross-blockchain authentication control logic, the processor is configured to: initiate a subscription request to a cross-chain interaction end, where the subscription request is used to notify the cross-chain interaction end of a subscription condition, so that the cross-chain interaction end requests, based on the subscription condition, data on the second blockchain that satisfies the subscription condition from the publishing client; and obtain, by a subscribing client that is implemented by the processor, the data on the second blockchain that is published by the publishing client and that satisfies the subscription condition, to use the data as the authentication data source.

In the present implementation, by reading and executing the machine executable instruction that is stored in the memory and that corresponds to the cross-blockchain authentication control logic, the processor is configured to perform SPV data authentication on the data to be authenticated based on the authentication data source and the data authentication rule configured on the first blockchain, to determine whether the data to be authenticated is included in the block on the second blockchain.

In the present implementation, by reading and executing the machine executable instruction that is stored in the memory and that corresponds to the cross-blockchain authentication control logic, the processor is configured to: calculate a hash value of the data to be authenticated; obtain a Merkle authentication path of the data to be authenticated on a Merkle tree of a target block on the second blockchain that includes the data to be authenticated; calculate a hash value of a block header of the target block based on the hash value of the data to be authenticated and a hash value of each node on the Merkle authentication path; and determine whether the calculated hash value of the block header of the target block matches a hash value that is of the block header of the target block and that is stored in the authentication data source; and if yes, determine that the data to be authenticated is included in the block on the second blockchain.

A person of ordinary skill in the art can easily figure out another implementation solution of the present specification after thinking over the present specification and practicing the present disclosure here. The present specification is intended to cover any variations, uses, or adaptations of the present specification, and these variations, uses, or adaptations follow the general principles of the present specification and include common knowledge or conventional techniques that are not disclosed in the technical field of the present specification. The present specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification.

The previous descriptions are merely preferred implementations of the present specification, but are not intended to limit the present specification. Any modification, equivalent replacement, or improvement made without departing from the spirit and principle of the present specification shall fall within the protection scope of the present specification.

Figure 8:
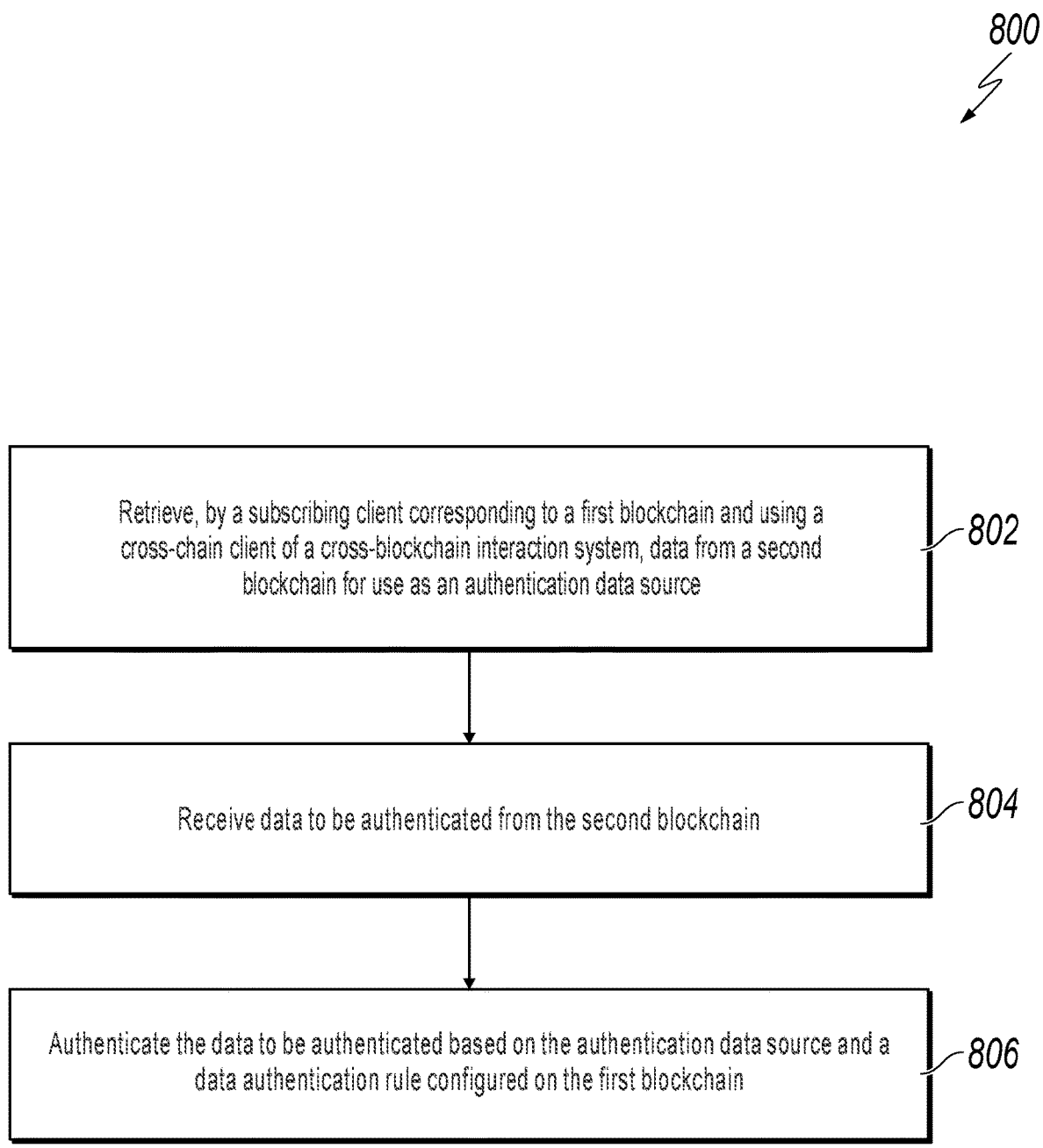
FIG. 8 is a flowchart illustrating an example of a computer-implemented method for cross-blockchain authentication, according to an implementation of the present disclosure.

FIG. 8 is a flowchart illustrating an example of a computer-implemented method 800 for cross-blockchain authentication, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, data is retrieved by a subscribing client by using a cross-chain client of a cross-blockchain interaction system. The data can be, for example, a transaction, a status, or an event. The data is retrieved from a second blockchain that is published by a publishing client. The data is used as an authentication data source, for example. The cross-blockchain interaction system includes the subscribing client, the publishing client, and a cross-chain client. The subscribing client corresponds to a first blockchain and is configured to maintain data that the first blockchain subscribes to from the second blockchain. The subscribing client can correspond, for example, to a node device on the first blockchain, where the node device is configured to maintain a message queue corresponding to the node device. The publishing client corresponds to the second blockchain and can be configured to obtain and publish data on the second blockchain that is completed through consensus. The cross-chain client is separately interconnected with the subscribing client. The publishing client and the first blockchain are used as a sidechain that is anchored to the second blockchain that is used as a main chain. As an example, referring to the cross-blockchain interaction system of FIG. 1, data can be retrieved by the subscribing client of FIG. 1 by using a cross-chain client of the cross-blockchain interaction system. The cross-blockchain interaction system of FIG. 1 can be, for example, a sidechain anchoring framework established based on a publishing and subscription model. The data can be retrieved from the second blockchain of FIG. 1 that is published by the publishing client of FIG. 1. The cross-blockchain interaction system of FIG. 1 includes the subscribing client of FIG. 1 and the publishing client of FIG.

1. A cross-chain client end can handle interactions between the publishing client of FIG. 1 and the subscribing client of FIG. 1. The subscribing client can correspond to the first blockchain of FIG. 1, and the publishing client can correspond to the second blockchain of FIG. 1. The cross-chain client can be separately interconnected with the subscribing client. The publishing client and the first blockchain can be used as a sidechain that is anchored to the second blockchain that is used as a main chain. In some implementations, the subscribing client can correspond, for example, to a node device on the first blockchain. In some implementations, the publishing client can correspond, for example, to a node device on the second blockchain.

In some implementations, retrieving the data can include the use of a subscription request. For example, a subscription request initiated by the subscribing client of FIG. 1 can be sent to the cross-chain interaction end of FIG. 1. The subscription request can be used to notify the cross-chain interaction end of a subscription condition. The request can trigger the cross-chain interaction end to request, based on the subscription condition, data on the second blockchain of FIG. 1 that satisfies the subscription condition from the publishing client of FIG. 1. The data on the second blockchain of FIG. 1 that is published by the publishing client of FIG. 1 and satisfies the subscription condition can be retrieved by the subscribing client of FIG. 1 for use of the data as the authentication data source. For example, the authentication data source can include block header data of each block on the second blockchain of FIG. 1. In some implementations, the authentication data source can depend on a data authentication protocol supported by the first blockchain of FIG. 1 and the second blockchain of FIG. 1.

In some implementations, the authentication rule can include authentication logic that depends on a specific type of the data recorded on the second blockchain. For example, each blockchain in a blockchain network (such as the second blockchain of the cross-blockchain interaction system of FIG. 1) can have an authentication rule that is specific to the blockchain, such based on the type of data used by the blockchain. From 802, method 800 proceeds to 804.

At 804, data to be authenticated is received from the second blockchain. For example, data from the second blockchain in the cross-blockchain interaction system of FIG. 1 can be received at the publishing client in the cross-blockchain interaction system of FIG. 1. From 804, method 800 proceeds to 806.

At 806, data authentication is performed on the data to be authenticated based on the authentication data source and a data authentication rule configured on the first blockchain. For example, the cross-blockchain interaction system of FIG. 1 can perform data authentication on the data received from the second blockchain in the cross-blockchain interaction system of FIG. 1.

In some implementations, performing data authentication on the data to be authenticated based on the authentication data source and the data authentication rule configured on the first blockchain can include performing simplified payment verification (SPV) data authentication. For example, SPV data authentication can be performed on the data to be authenticated based on the authentication data source and the data authentication rule configured on the first blockchain of FIG. 1. For example, the SPV data authentication can determine whether the data to be authenticated is included in the block on the second blockchain.

In some implementations, performing SPV data authentication on the data to be authenticated based on the authentication data source and the data authentication rule configured on the first blockchain can include the use of hash values. For example, a hash value of the data to be authenticated can be calculated. A Merkle authentication path of the data to be authenticated on a Merkle tree of a target block on the second blockchain that includes the data to be authenticated can be retrieved. A hash value of a block header of the target block can be calculated, for example, based on the hash value of the data to be authenticated and a hash value of each node on the Merkle authentication path. A determination can be made whether the calculated hash value of the block header of the target block matches a hash value in the block header of the target block stored in the authentication data source. In response to determining that the calculated hash value of the block header of the target block matches the hash value in the block header of the target block stored in the authentication data source, a determination can be made that the data to be authenticated is included in the block on the second blockchain. After 806, method 800 stops.

The present disclosure relates to cross-blockchain authentication. In particular, the method includes the following: obtaining, by the subscribing client by using a cross-chain client, data on a second blockchain that is published by a publishing client, to use the data as an authentication data source, receiving data to be authenticated from the second blockchain, and performing data authentication on the data to be authenticated based on the authentication data source and a data authentication rule configured on the first blockchain. An advantage of the method and the device is that when mutually isolated, different blockchains can verify data on a peer blockchain. The different blockchains can then implement non-invasive sidechain anchoring to effectively anchor to another blockchain and to establish a low-complexity and high-expansibility cross-chain network. Simplified payment verification (SPV) data authentication can be performed on the data to be authenticated based on the authentication data source and the data authentication rule configured on the first blockchain. The SPV data authentication can be used to determine whether the data to be authenticated is included in the block on the second blockchain. SPV data authentication on the data to be authenticated can include the use of hash values of the data to be authenticated, hash values of each node on a Merkle authentication path of a Merkle tree, and a hash value stored in a block header of the target block.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for cross-blockchain authentication, comprising:
publishing, by a publishing client to a cross-chain client of a cross-blockchain interaction system, first data received from a second blockchain, the first data serving as an authentication source for the second blockchain;

retrieving, by a subscribing client, the first data from the cross-chain client, the subscribing client corresponding to a first blockchain, wherein the subscribing client is different from the publishing client, wherein the cross-chain client is separately interconnected with the subscribing client, and wherein the publishing client and the first blockchain serve as a sidechain that is anchored to the second blockchain, which is used as a main chain;

receiving, by the subscribing client and from the second blockchain, second data to be authenticated, wherein the second data is different from the first data; and authenticating, by the subscribing client, the second data based on the first data and a data authentication rule configured on the first blockchain.

2. The computer-implemented method of claim 1, wherein retrieving the first data comprises:

initiating, by the subscribing client and as a subscription, a subscription request to a cross-chain interaction end, wherein the subscription request is used to notify the cross-chain interaction end of a subscription condition;

requesting, using the cross-chain interaction end and based on the subscription condition, the first data on the second blockchain that satisfies the subscription condition from the publishing client; and retrieving, using the subscription, the first data on the second blockchain that is published by the publishing client and that satisfies the subscription condition.

3. The computer-implemented method of claim 2, wherein the first data comprises block header data of each block on the second blockchain.

4. The computer-implemented method of claim 3, wherein authenticating the second data comprises:

performing, to determine whether the second data is included in a block on the second blockchain, simplified payment verification (SPV) data authentication on the second data based on the first data serving as the authentication data source and the data authentication rule configured on the first blockchain.

5. The computer-implemented method of claim 4, wherein performing SPV data authentication on the second data comprises:

calculating a hash value of the second data;

retrieving a Merkle authentication path of the second data on a Merkle tree of a target block on the second blockchain that includes the second data;

calculating, as a calculated hash value, a hash value of a block header of the target block based on the hash value of the second data and a hash value of each node on the Merkle authentication path;

determining whether the calculated hash value matches a hash value in the block header of the target block stored in the first data serving as the authentication data source; and in response to determining that the calculated hash value of the block header of the target block matches the hash value in the block header of the target block stored in the first data serving as the authentication data source, determining that the second data is included in the block on the second blockchain.

6. The computer-implemented method of claim 1, wherein the subscribing client corresponds to a node device on the first blockchain, and wherein the publishing client corresponds to a node device on the second blockchain.

7. The computer-implemented method of claim 1, wherein:

the second data includes at least one of a transaction, a status, and an event;

the first data serving as the authentication data source depends on a data authentication protocol supported by the first blockchain and the second blockchain; and the data authentication rule includes authentication logic that depends on a specific type of the data recorded on the second blockchain.

8. A non-transitory, computer-readable medium storing one or more instructions executable by a computer system to perform operations comprising:

publishing, by a publishing client to a cross-chain client of a cross-blockchain interaction system, first data received from a second blockchain, the first data serving as an authentication source for the second blockchain;

retrieving, by a subscribing client, the first data from the cross-chain client, the subscribing client corresponding to a first blockchain, wherein the subscribing client is different from the publishing client, wherein the cross-chain client is separately interconnected with the subscribing client, and wherein the publishing client and the first blockchain serve as a sidechain that is anchored to the second blockchain, which is used as a main chain;

receiving, by the subscribing client and from the second blockchain, second data to be authenticated, wherein the second data is different from the first data; and authenticating, by the subscribing client, the second data based on the first data and a data authentication rule configured on the first blockchain.

9. The non-transitory, computer-readable medium of claim 8, wherein retrieving the first data comprises:

initiating, by the subscribing client and as a subscription, a subscription request to a cross-chain interaction end, wherein the subscription request is used to notify the cross-chain interaction end of a subscription condition;

requesting, using the cross-chain interaction end and based on the subscription condition, the first data on the second blockchain that satisfies the subscription condition from the publishing client; and retrieving, using the subscription, the first data on the second blockchain that is published by the publishing client and that satisfies the subscription condition.

10. The non-transitory, computer-readable medium of claim 9, wherein the first data comprises block header data of each block on the second blockchain.

11. The non-transitory, computer-readable medium of claim 10, wherein authenticating the second data comprises:

performing, to determine whether the second data is included in a block on the second blockchain, simplified payment verification (SPV) data authentication on the second data based on the first data serving as the authentication data source and the data authentication rule configured on the first blockchain.

12. The non-transitory, computer-readable medium of claim 11, wherein performing SPV data authentication on the data comprises:

calculating a hash value of the second data;

retrieving a Merkle authentication path of the second data on a Merkle tree of a target block on the second blockchain that includes the second data;

calculating, as a calculated hash value, a hash value of a block header of the target block based on the hash value of the second data and a hash value of each node on the Merkle authentication path;

determining whether the calculated hash value matches a hash value in the block header of the target block stored in the first data serving as the authentication data source; and in response to determining that the calculated hash value of the block header of the target block matches the hash value in the block header of the target block stored in the first data serving as the authentication data source, determining that the second data is included in the block on the second blockchain.

13. The non-transitory, computer-readable medium of claim 8, wherein the subscribing client corresponds to a node device on the first blockchain, and wherein the publishing client corresponds to a node device on the second blockchain.

14. The non-transitory, computer-readable medium of claim 8, wherein:

the second data includes at least one of a transaction, a status, and an event;

the first data serving as the authentication data source depends on a data authentication protocol supported by the first blockchain and the second blockchain; and the data authentication rule includes authentication logic that depends on a specific type of the data recorded on the second blockchain.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

publishing, by a publishing client to a cross-chain client of a cross-blockchain interaction system, first data received from a second blockchain, the first data serving as an authentication source for the second blockchain;

retrieving, by a subscribing client, the first data from the cross-chain client, the subscribing client corresponding to a first blockchain, wherein the subscribing client is different from the publishing client, wherein the cross-chain client is separately interconnected with the subscribing client, and wherein the publishing client and the first blockchain serve as a sidechain that is anchored to the second blockchain, which is used as a main chain;

receiving, by the subscribing client and from the second blockchain, second data to be authenticated, wherein the second data is different from the first data; and authenticating, by the subscribing client, the second data based on the first data and a data authentication rule configured on the first blockchain.

16. The computer-implemented system of claim 15, wherein retrieving the first data comprises:

initiating, by the subscribing client and as a subscription, a subscription request to a cross-chain interaction end, wherein the subscription request is used to notify the cross-chain interaction end of a subscription condition;

requesting, using the cross-chain interaction end and based on the subscription condition, the first data on the second blockchain that satisfies the subscription condition from the publishing client; and retrieving, using the subscription, the first data on the second blockchain that is published by the publishing client and that satisfies the subscription condition.

17. The computer-implemented system of claim 16, wherein the first data comprises block header data of each block on the second blockchain.

18. The computer-implemented system of claim 17, wherein authenticating the second data comprises:

performing, to determine whether the second data is included in a block on the second blockchain, simplified payment verification (SPV) data authentication on the second data based on the first data serving as the authentication data source and the data authentication rule configured on the first blockchain.

19. The computer-implemented system of claim 18, wherein performing SPV data authentication on the data comprises:

calculating a hash value of the second data;

retrieving a Merkle authentication path of the second data on a Merkle tree of a target block on the second blockchain that includes the second data;

calculating, as a calculated hash value, a hash value of a block header of the target block based on the hash value of the second data and a hash value of each node on the Merkle authentication path;

determining whether the calculated hash value matches a hash value in the block header of the target block stored in the first data serving as the authentication data source; and in response to determining that the calculated hash value of the block header of the target block matches the hash value in the block header of the target block stored in the first data serving as the authentication data source, determining that the second data is included in the block on the second blockchain.

20. The computer-implemented system of claim 15, wherein the subscribing client corresponds to a node device on the first blockchain, and wherein the publishing client corresponds to a node device on the second blockchain.

* * * * *